(12) United States Patent
Wang et al.

(10) Patent No.: US 10,338,273 B2
(45) Date of Patent: Jul. 2, 2019

(54) ADJUSTABLE KARST UNDERGROUND WATER AND SOIL LOSS SIMULATION APPARATUS

(71) Applicant: Guizhou Normal University, Guizhou (CN)

(72) Inventors: Hengsong Wang, Guizhou (CN); Zhengpeng Luo, Guizhou (CN); Yulin Zhang, Guizhou (CN)

(73) Assignee: Guizhou Normal University, Guizhou (CN)

( * ) Notice: Subject to any disclaimer, the term of this patent is extended or adjusted under 35 U.S.C. 154(b) by 0 days.

(21) Appl. No.: 15/784,090

(22) Filed: Oct. 14, 2017

(65) Prior Publication Data

US 2018/0128939 A1 May 10, 2018

(30) Foreign Application Priority Data

Nov. 9, 2016 (CN) .......................... 2016 1 0985599

(51) Int. Cl.
*G01V 99/00* (2009.01)
*G01V 9/02* (2006.01)

(52) U.S. Cl.
CPC .............. *G01V 99/005* (2013.01); *G01V 9/02* (2013.01)

(58) Field of Classification Search
CPC ............................. G01V 99/005; G01V 9/02
USPC ....................................................... 73/866.4
See application file for complete search history.

(56) References Cited

U.S. PATENT DOCUMENTS

| | | | |
|---|---|---|---|
| 5,191,787 A | | 3/1993 | Hanson |
| 2016/0363691 A1* | | 12/2016 | Hu .......................... G01V 1/345 |

FOREIGN PATENT DOCUMENTS

| CN | 201859104 U | * | 11/2010 |
|---|---|---|---|
| CN | 103454404 A | | 12/2013 |
| CN | 103691594 A | * | 12/2013 |
| CN | 103743884 A | | 4/2014 |
| CN | 203561633 U | * | 4/2014 |
| CN | 105223339 A | | 1/2016 |

(Continued)

OTHER PUBLICATIONS

Translation of SU 1399805 A—Valykonis (Year: 1985).*
Translation of CN 203561633 U—Cheng (Year: 2014).*
Translation of CN 201859104 U—Dai (Year: 2010).*

*Primary Examiner* — Nathaniel T Woodward
(74) *Attorney, Agent, or Firm* — Wayne & Ken, LLC; Tony Hom

(57) ABSTRACT

The present invention discloses an adjustable karst water and soil loss simulation apparatus, comprising a surface runoff region, a vegetation buffer layer, a rainfall simulation apparatus, a bare rock-soil layer, a ponor, a slope adjuster, permeable layers, an underground river emergence point, a water receiving port, a glass perspective plate, a movable chassis and a waterproof base layer. The apparatus in the present invention can simulate special surface and underground dual environments in a karst environment, thereby aiding interpretation, providing simulation of a real environment under various environmental condition differences and bringing accurate water and soil loss data under similar conditions. Moreover, the apparatus has characteristics of transparent simulation, accurate numerical value, wide simulation application scope, simple structure, portability, convenient use, durability and the like.

6 Claims, 4 Drawing Sheets

(56) References Cited

FOREIGN PATENT DOCUMENTS

| | | |
|---|---|---|
| CN | 205538580 U | 8/2016 |
| CN | 206177944 U | 5/2017 |
| EP | 2056105 A1 | 5/2009 |
| SU | 1399805 A * | 11/1985 |

* cited by examiner

ADJUSTABLE KARST UNDERGROUND WATER AND SOIL LOSS SIMULATION APPARATUS

TECHNICAL FIELD

The present invention relates to a karst environment simulation apparatus, and particularly relates to an adjustable karst underground water and soil loss simulation apparatus.

BACKGROUND

Karst topography is distributed in soluble rock areas all over the world, and has a total area of $51 \times 10^6$ square kilometers, accounting for about 10% of total area of the earth. A karst distribution area in China is about 0.91-1.3 million square kilometers, wherein karst mountain regions in the Yunnan-Guizhou Plateau under subtropical monsoon climate have the worst environment and the most prominent contradiction between people and land. Due to an unscientific production development manner of local people and factors such as centralized monsoon climate rainfall, huge mountain elevation differences and the like, as well as a particularly obvious water and soil loss phenomenon caused by unique duality and vulnerability of the karst environment, productivity and living standards of people have been severely influenced. How to simulate a karst rock desertification environment under different conditions and obtain accurate water and soil loss data to serve karst study, in order to help people understand the karst environment and an underground water and soil loss formation mechanism and to guide people to realize development according to local conditions in a special environment has become urgent problems to be solved.

SUMMARY

A technical problem to be solved in the present invention is to provide an adjustable karst water and soil loss simulation apparatus, so as to clearly and accurately show an environmental condition difference between a special earth surface and an underground binary structure in a karst environment, thereby aiding interpretation, providing simulation of a real environment under various environmental conditions, and bringing accurate water and soil loss data under similar conditions.

In order to solve the above technical problem, a technical solution is adopted in the present invention as follows.

The adjustable karst underground water and soil loss simulation apparatus comprises a simulated earth surface layer positioned on an upper part of the apparatus and a simulated underground layer positioned on a lower part of the apparatus, wherein a surface runoff region, a vegetation buffer layer, a rainfall simulation apparatus, a bare rock-soil layer, a ponor, a slope adjuster and permeable layers are arranged on the simulated earth surface layer; an underground river emergence point, a water receiving port, a glass perspective plate, a movable chassis and a waterproof base layer are arranged on the simulated underground layer; the surface runoff region is positioned on an inner side of the apparatus; the vegetation buffer layer is distributed sporadically; the rainfall simulation apparatus is positioned at the uppermost end of the apparatus; the slope adjuster is positioned below the permeable layers and adjusts a slope of the permeable layers to be 0-15 degrees according to a simulation need; and the water receiving port is connected with the movable chassis and can be pulled out along with the movable chassis.

In the above adjustable karst underground water and soil loss simulation apparatus, the permeable layers are movably mounted on inner walls of the apparatus; a quantity of the permeable layers is at least two; the permeable layers can be replaced according to the simulation need; and a simulated fissure degree of each permeable layer is in a range of 5-15%.

In the above adjustable karst water and soil loss simulation apparatus, the permeable layers can further be composed of two layers; both of the two layers have fissures; and the fissure degree is controlled in a dislocation manner.

In the above adjustable karst underground water and soil loss simulation apparatus, preferably the quantity of the permeable layers is three; and the simulated fissure degrees of the three permeable layers are respectively 5%, 10% and 15% and are respectively used for simulating fissure degrees of 5%, 10% and 15%.

In the above adjustable karst underground water and soil loss simulation apparatus, the rainfall simulation apparatus is selected from PVC pipes with fine pores, and the pores are all downward for providing simulated rainwater input.

The present invention has beneficial effects as follows: compared with the prior art, the present invention has characteristics as follows.

1. The simulation process is clear with transparency and values accurate. Compared with a traditional simulation device, the simulation apparatus in the present invention realizes a whole visual simulation process, and explains all procedures namely rainwater input, water drop infiltration, catchment and runoff production as well as dual loss to scientific researchers, workers and learners one to one and gives simple, clear and powerful solutions to interpretation of water and soil shortage problems in karst regions. In the apparatus, surface runoff is directly ledout of the ponor and is distinguished from surface fissure leakage, so that numerical values of the surface runoff and the surface fissure leakage are more reliable. Moreover, due to presence of the movable chassis, which can be pulled out at the end of simulation, residual lost water and soil are all collected, enabling the simulated values accurate.

2. An application range is wide, and simulation cost is reduced. Since the apparatus in the present invention has an adjustable structure, the application range is not limited to inflexible simulation under a fixed condition value, and different environmental conditions in a natural environment can be subjected to flexible adaptive simulation according to needs of science researchers. On one hand, comparative study is conveniently made; and on the other hand, since the apparatus can achieve a "one-machine multi-purpose" effect, unnecessary cost in traditional simulation is reduced.

3. The apparatus is simple and light in structure, convenient to use and durable in use. The apparatus in the present invention is simple in structure and easy to manufacture and does not need a complicated technological step. Materials needed by the vegetation buffer layer, the bare rock-soil layer and the permeable layers of the present apparatus are readily available, recyclable, low in manufacturing cost, light and durable in use and have extremely high bearing capacity, so that the apparatus is durable in use and difficult to be damaged. The apparatus in the present invention can be moved and used indoors and outdoors according to the

The present invention is further described below in combination with drawings and specific embodiments.

DETAILED DESCRIPTION

Embodiment 1

Figure 1:
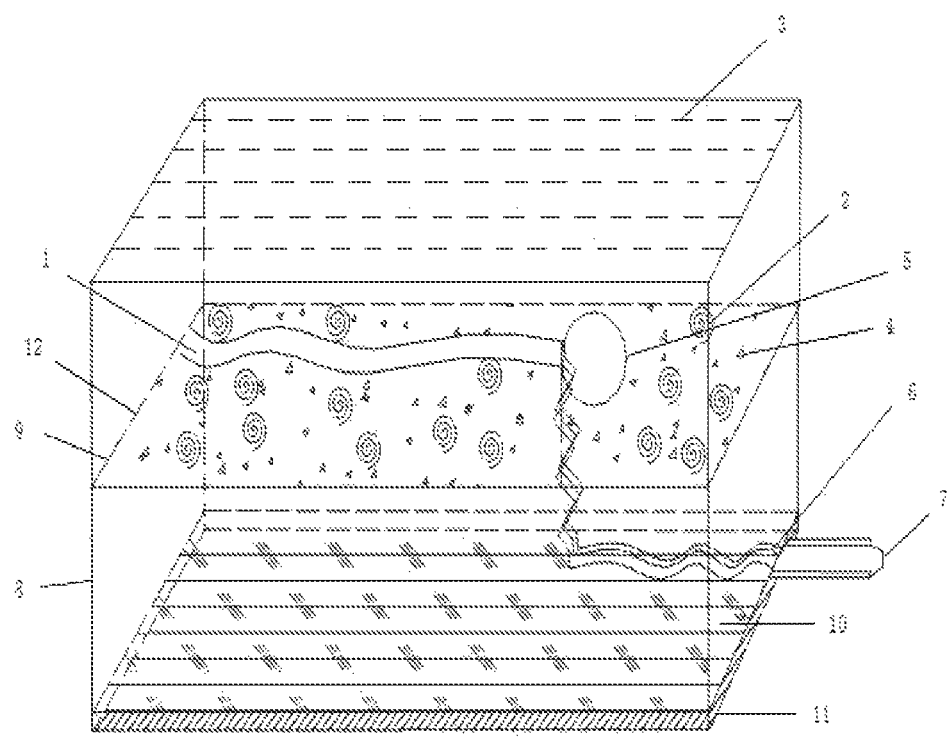
FIG. 1 is a three-dimensional structural schematic diagram of the present invention.
Figure 2:
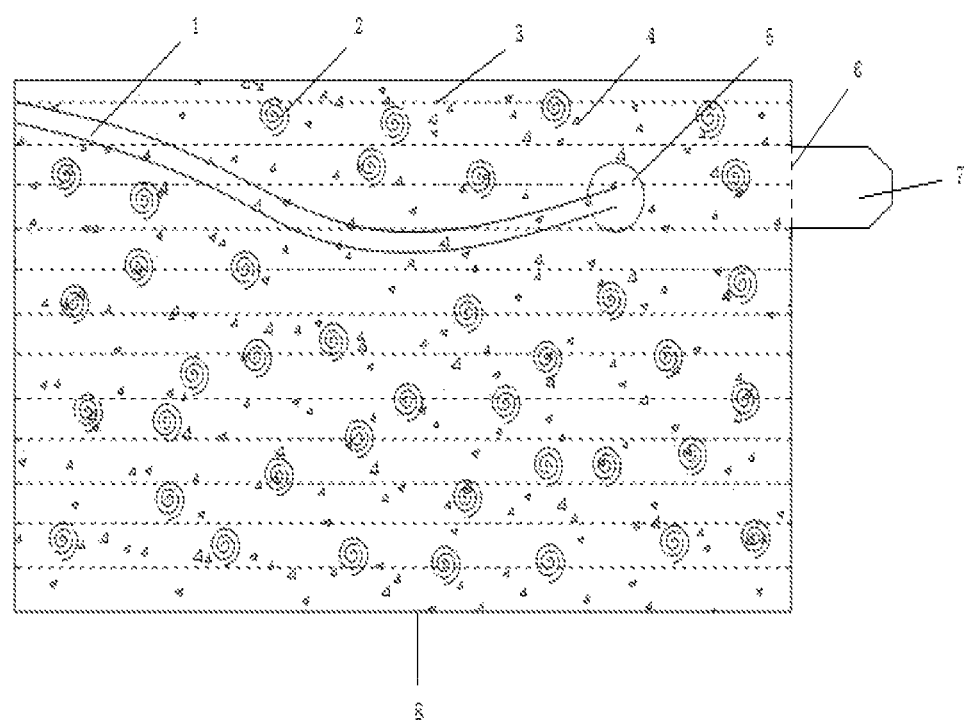
FIG. 2 is a top view of the present invention.
Figure 3:
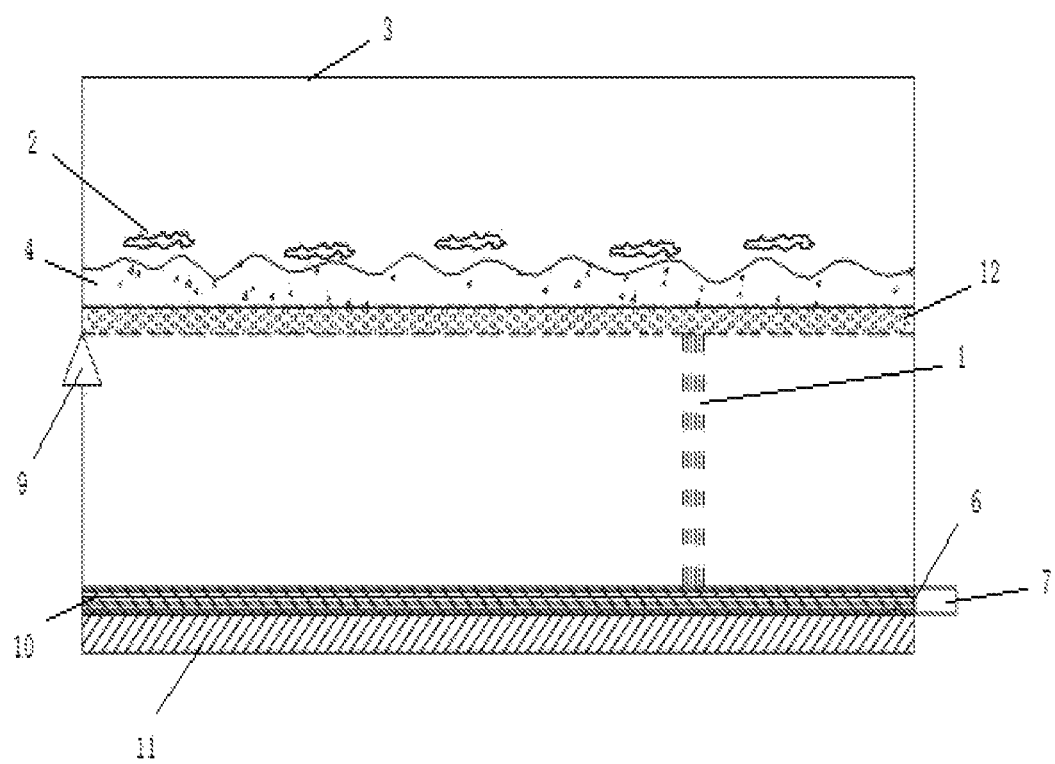
FIG. 3 is a side structural view of the present invention.
Figure 4:
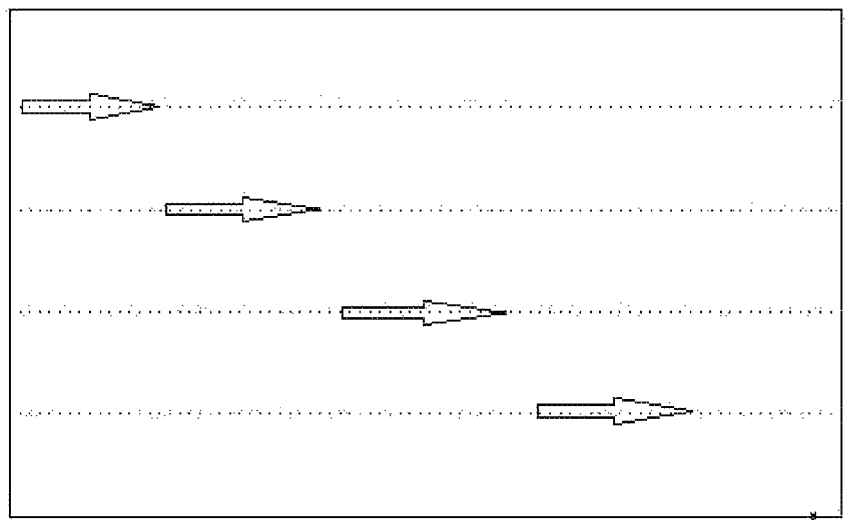
FIG. 4 is a streamline picture of rainfall in the present invention.

As shown in FIG. 1, the whole apparatus has a cuboid appearance and is divided into an upper layer and a lower layer for simulating respectively special surface and underground dual environments in a karst environment. The apparatus comprises a simulated earth surface layer positioned on an upper part of the apparatus and a simulated underground layer positioned on a lower part of the apparatus, wherein a surface runoff region 1, a vegetation buffer layer 2, a rainfall simulation apparatus 3, a bare rock-soil layer 4, a ponor 5, a slope adjuster 9 and permeable layers 12 are arranged on the simulated earth surface layer; the surface runoff region 1 is positioned on an inner side of the apparatus and distinguished from a water and soil leakage region; and the vegetation buffer layer 2 is distributed sporadically according to a need of a simulated rock desertification degree. Materials of the vegetation buffer layer 2 may be optionally selected from real moss, leaved branches and the like. The rainfall simulation apparatus 3 is positioned at the uppermost end of the apparatus and selected from PVC pipes with fine pores. The pores are all downward for providing simulated rainwater input. The permeable layers 12 are movably installed on inner walls of the apparatus through clamping grooves. A quantity of the permeable layers 12 is at least two. A simulated fissure degree of each of the permeable layers 12 is in a range of 5-15%. The permeable layers can be replaced according to the simulation need, thereby facilitating the simulation of various natural environmental conditions and obtaining accurate data. In the present embodiment, the quantity of the permeable layers 12 is set as three; materials of the permeable layers are selected from plastic foam boards; the simulated fissure degrees of the three permeable layers 12 are respectively 5%, 10% and 15% and are respectively used for simulating fissure degrees of 5%, 10% and 15%; and each of the permeable layers 12 is independently installed. The slope adjuster 9 is positioned below the permeable layers 12 and can adjust a slope of the permeable layers 12 to be 0-15 degrees according to the simulation need, and adjustable simulation conditions can be realized by virtue of the slope adjuster 9 and the adjustable permeable layers 12. An underground river emergence point 6, a water receiving port 7, a glass perspective plate 8, a movable chassis 10 and a waterproof base layer 11 are arranged on the simulated underground layer, and the glass perspective plate 8 and the slope adjuster 9 serve as a joint of the two parts. Through the glass perspective plate 8, an internal structure of the whole apparatus and a water and soil loss process can be explained to viewers one to one. The water receiving port 7 is connected with the movable chassis 10 and can be pulled out along with the movable chassis 10, thereby facilitating the collection of water and soil taken away by surface runoff or surface leakage underground and providing strict water and soil loss values. Materials of the water receiving port 7 may be selected from alloy plates or other waterproof materials.

Embodiment 2

The whole apparatus has a cuboid appearance and is divided into an upper layer and a lower layer for simulating special surface and underground dual environments in a karst environment. The apparatus comprises a simulated earth surface layer positioned on an upper part of the apparatus and a simulated underground layer positioned on a lower part of the apparatus, wherein a surface runoff region 1, a vegetation buffer layer 2, a rainfall simulation apparatus 3, a naked rock-soil layer 4, a ponor 5, a slope adjuster 9 and permeable layers 12 are arranged on the simulated earth surface layer; the surface runoff region 1 is positioned on an inner side of the apparatus and distinguished from a water and soil leakage region; the vegetation buffer layer 2 is distributed sporadically according to a need of a simulated rock desertification degree, and materials of the vegetation buffer layer 2 may be optionally selected from real moss, leaved branches and the like. The rainfall simulation apparatus 3 is positioned at the uppermost end of the apparatus and selected from PVC pipes with fine pores, and the pores are all downward for providing simulated rainwater input. The slope adjuster 9 is positioned below the permeable layers 12 and can adjust a slope of the permeable layers 12 to be 0-15 degrees according to a simulation need. An underground river emergence point 6, a water receiving port 7, a glass perspective plate 8, a movable chassis 10 and a waterproof base layer 11 are arranged on the simulated underground layer. The water receiving port 7 is connected with the movable chassis 10 and can be pulled out along with the movable chassis 10. Materials of the water receiving port 7 may be selected from alloy plates or other waterproof materials. A difference from embodiment 1 is as follows: the whole permeable layers 12 are composed of two layers, both of the two layers have fissures, and the fissure degree is controlled in a dislocation manner.

Embodiments in the present invention are not limited to the above embodiments. Various changes made on premise of not deviating from a purpose of the present invention belong to a protection scope of the present invention.

What is claimed is:

1. An adjustable simulation apparatus for simulating karst underground water and soil loss, comprising
   a simulated earth surface layer positioned on an upper part of the apparatus and a simulated underground layer positioned on a lower part of the apparatus; wherein
   the simulated earth surface layer comprises a surface runoff region, a vegetation buffer layer, a rainfall simulation device, a bare rock-soil layer, a ponor, a slope adjuster and permeable layers; the simulated underground layer comprises an underground river emergence point, a water receiving port, a glass perspective plate, a movable chassis and a waterproof base layer;
   the surface runoff region is positioned at an inner side of the apparatus; the vegetation buffer layer is distributed sporadically on the bare rock soil layer; the rainfall simulation device is positioned at the uppermost end of the apparatus; the slope adjuster is positioned below the permeable layers and adjusts a slope of the permeable layers to be 0-15 degrees according to a simulation need; and the water receiving port is connected with the movable chassis such that the movable chassis and the water receiving port are removably attached to the apparatus.

2. The apparatus according to claim 1, wherein the permeable layers are movably mounted on inner walls of the apparatus; a quantity of the permeable layers is at least two; the permeable layers are replaced according to the simulation need; and a simulated fissure degree of each permeable layer is in a range of 5-15%.

3. The apparatus according to claim 2, wherein the quantity of the permeable layers is three; and the simulated fissure degrees of the three permeable layers are respectively 5%, 10% and 15% and are respectively used for simulating fissure degrees of 5%, 10% and 15%.

4. The apparatus according to claim 1, wherein the permeable layers are further composed of two layers; both of the two layers have fissures; and the simulated fissure degree of each layers is controlled in a dislocation manner.

5. The apparatus according to claim 1, wherein the rainfall simulation device is selected from PVC pipes with fine pores, and the pores are all downward for providing simulated rainwater input.

6. The apparatus according to claim 1, wherein the apparatus is applied to simulating underground dual environmental conditions in a karst environment so as to provide water and soil loss reference data for change of real environmental conditions.

* * * * *